United States Patent
Chen et al.

(10) Patent No.: US 9,774,283 B2
(45) Date of Patent: Sep. 26, 2017

(54) MOTOR DRIVING CIRCUIT AND METHOD

(71) Applicant: Anpec Electronics Corporation, Hsin-Chu (TW)

(72) Inventors: Kun-Min Chen, Changhua County (TW); Ching-Sheng Li, Hsinchu County (TW); Ching-Shan Lu, Kaohsiung (TW); Ming-Jung Tsai, Hsinchu (TW)

(73) Assignee: Anpec Electronics Corporation, Hsin-Chu (TW)

( * ) Notice: Subject to any disclaimer, the term of this patent is extended or adjusted under 35 U.S.C. 154(b) by 0 days.

(21) Appl. No.: 14/951,500

(22) Filed: Nov. 25, 2015

(65) Prior Publication Data
US 2016/0087562 A1 Mar. 24, 2016

Related U.S. Application Data

(63) Continuation-in-part of application No. 13/596,053, filed on Aug. 28, 2012, now abandoned.

(30) Foreign Application Priority Data

Jul. 24, 2012 (TW) ............................. 101126595 A (51) Int. Cl.
| H02P 6/16 | (2016.01) |
| H02P 6/10 | (2006.01) |
| H02P 6/15 | (2016.01) |
| H02P 7/00 | (2016.01) |

(52) U.S. Cl.
CPC ................. *H02P 6/16* (2013.01); *H02P 6/10* (2013.01); *H02P 6/15* (2016.02)

(58) Field of Classification Search
CPC ..................................... H02P 6/12; H02P 6/15
USPC ............................................................. 318/1
See application file for complete search history.

(56) References Cited

U.S. PATENT DOCUMENTS

| 6,160,851 A * | 12/2000 | Brown ................ H04L 25/0286 333/177 |
| 2003/0057899 A1* | 3/2003 | LaCroix .................. H02P 29/02 318/114 |
| 2003/0175017 A1 | 9/2003 | Pelonis |
| 2005/0189891 A1* | 9/2005 | Kurosawa ................. H02P 6/28 318/400.35 |
| 2005/0218849 A1 | 10/2005 | Sanglikar |

(Continued)

FOREIGN PATENT DOCUMENTS

| TW | M255588 | 1/2005 |
| TW | 200737684 | 10/2007 |
| TW | M348423 | 1/2009 |

*Primary Examiner* — Bentsu Ro
*Assistant Examiner* — Said Bouziane
(74) *Attorney, Agent, or Firm* — Winston Hsu (57) ABSTRACT

A motor driving circuit for driving a direct-current (DC) motor, includes a driving circuit for converting an input voltage into a first and a second output voltages, a Hall sensor for generating a first and a second time sequential control signals according to a working condition of the DC motor, a current sensing unit for comparing the motor current to a reference current to generate a comparison result, and a control unit coupled to the driving circuit, the current sensing unit and the Hall sensor for controlling a working status of the driving circuit according to the first and the second time sequential control signals and the comparison result.

10 Claims, 8 Drawing Sheets

(56) References Cited

U.S. PATENT DOCUMENTS

| | | | |
|---|---|---|---|
| 2007/0285038 A1* | 12/2007 | Tsai | H02P 6/26 |
| | | | 318/434 |
| 2010/0244757 A1* | 9/2010 | Tsai | H02P 7/285 |
| | | | 318/434 |
| 2010/0253259 A1 | 10/2010 | Chen | |
| 2010/0288383 A1* | 11/2010 | Houghton | F16K 11/074 |
| | | | 137/625.17 |
| 2010/0332059 A1* | 12/2010 | Lee | B62K 23/04 |
| | | | 701/22 |
| 2011/0062910 A1 | 3/2011 | Tsai | |
| 2011/0125450 A1* | 5/2011 | Lindenstruth | G01M 13/027 |
| | | | 702/113 |
| 2014/0058687 A1* | 2/2014 | Wang | G01R 31/3624 |
| | | | 702/51 |

* cited by examiner

MOTOR DRIVING CIRCUIT AND METHOD

CROSS REFERENCE TO RELATED APPLICATIONS

This application is a continuation-in-part application of U.S. application Ser. No. 13/596,053 filed on Aug. 28, 2012.

BACKGROUND OF THE INVENTION

1. Field of the Invention

The present invention relates to a motor driving circuit and method, and more particularly, to a motor driving circuit and method capable of reducing power consumption and avoiding continuous generation of reverse current.

2. Description of the Prior Art

A direct-current (DC) motor driver is a necessary power transformation device in modern industries, which is capable of transforming electrical energy into kinetic energy required for driving devices. Conventional motors include DC motors, AC motors, and stepping motors. DC motors and AC motors are often applied in products which do not require particularly delicate manipulation, for example, blades of an electric fan are usually rotated by utilizing a DC motor or AC motor. In recent years, how to design motors with better performance has become a major objective in the industry.

Figure 1:
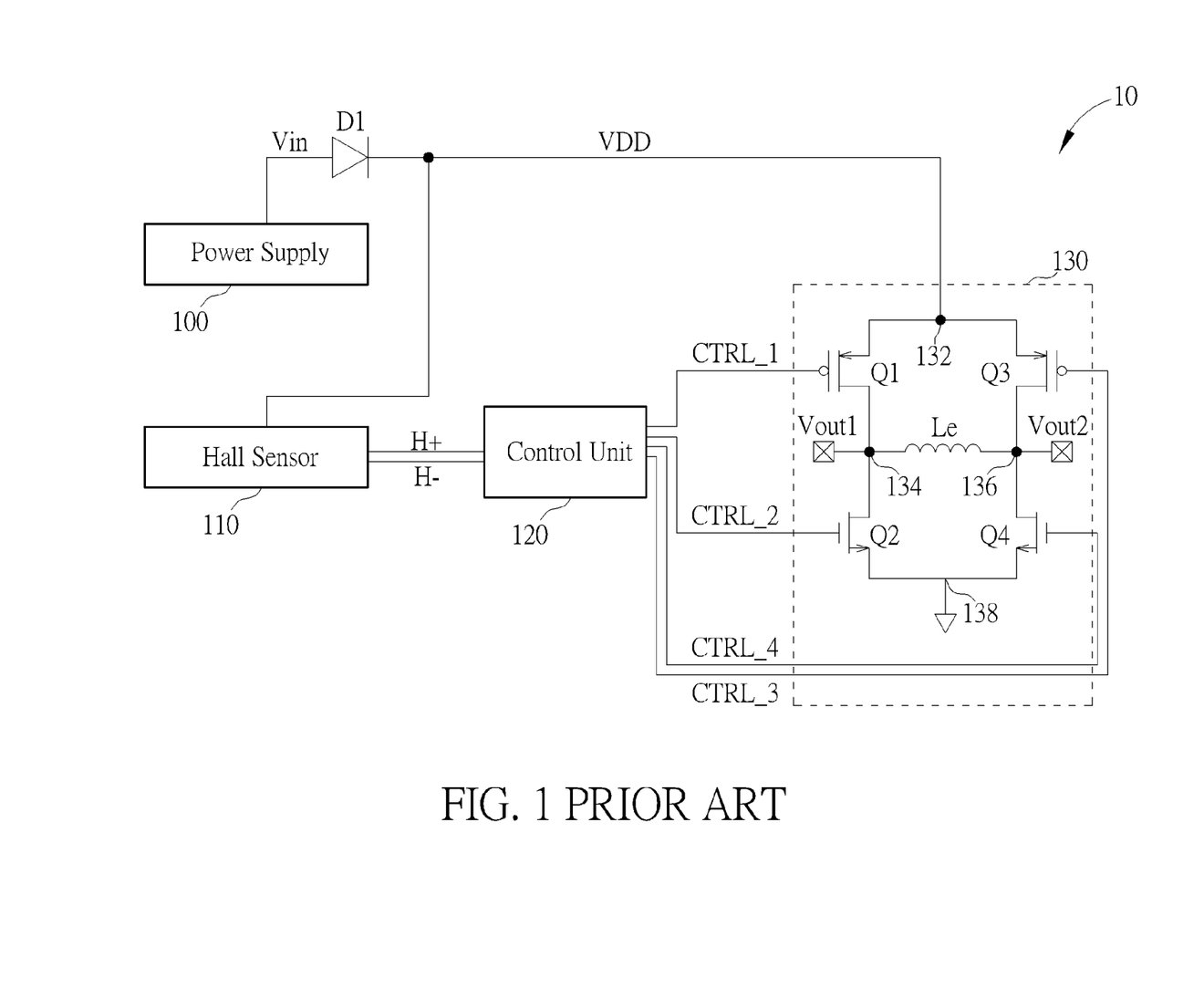
FIG. 1 is a schematic diagram of a conventional motor driving circuit.

Please refer to FIG. 1, which is a schematic diagram of a conventional motor driving circuit 10. The motor driving circuit 10 includes a power supply 100, a protection diode D1, a Hall sensor 110, a control unit 120, a driving circuit 130 and a motor load Le. The power supply 100 is utilized for generating an input voltage Vin. The protection diode D1 is coupled to the power supply 100, for protecting the power supply 100 and avoiding power source reversal connection which may burn down the entire integrated circuit. The Hall sensor 110 senses locations of the magnetic poles of the motor load Le for generating a first time sequential control signal H+ and a second time sequential control signal H− according to the working characteristic of the motor load Le. The control unit 120 is coupled to the Hall sensor 110, for receiving the first time sequential control signal H+ and the second time sequential control signal H−, and generating a first transistor control signal CTRL_1, a second transistor control signal CTRL_2, a third transistor control signal CTRL_3 and a fourth transistor control signal CTRL_4 accordingly, so as to control the driving circuit 130. In detail, the driving-stage circuit 130 includes an input terminal 132, a first output terminal 134, a second output terminal 136, a first transistor Q1, a second transistor Q2, a third transistor Q3 and a fourth transistor Q4. The input terminal 132, which is coupled to the protection diode D1, is used for receiving the supply voltage VDD. The first output terminal 134 and the second output terminal 136 are used for outputting a first output voltage Vout1 and a second output voltage Vout2, respectively. The first transistor Q1, which is coupled to the control unit 120, the input terminal 132 and the first output terminal 134, is used for switching the conduction condition between the input terminal 132 and the first output terminal 134 according to the first transistor control signal CTRL_1. The second transistor Q2, which is coupled to the control unit 120, a grounding terminal 138 and the first output terminal 134, is used for switching the conduction condition between the first output terminal 134 and the grounding terminal 138 according to the second transistor control signal CTRL_2. The third transistor Q3, which is coupled to the control unit 120, the input terminal 132 and the second output terminal 136, is used for switching the conduction condition between the input terminal 132 and the second output terminal 136 according to the third transistor control signal CTRL_3. The fourth transistor Q4, which is coupled to the control unit 120, the grounding terminal 138 and the second output terminal 136, is used for switching the conduction condition between the second output terminal 136 and the grounding terminal 138 according to the fourth transistor control signal CTRL_4. Each of the first transistor Q1, the second transistor Q2, the third transistor Q3 and the fourth transistor Q4 can be either a P-type metal-oxide-semiconductor (MOS) transistor or an N-type MOS transistor. In FIG. 1, the first transistor Q1 and the third transistor Q3 are P-type MOS transistors, while the second transistor Q2 and the fourth transistor Q4 are N-type MOS transistors. Those skilled in the art know that the above configuration for the first transistor Q1, the second transistor Q2, the third transistor Q3 and the fourth transistor Q4 in FIG. 1 is merely one example of possible configurations. The motor load Le, which is coupled to the first output terminal 134 and the second output terminal 136, is used for generating a motor current IL according to the first output voltage Vout1 and the second output voltage Vout2. When the motor current IL is positive, the direction of the motor current IL is from the first output terminal 134 to the second output terminal 136; otherwise, when the motor current IL is negative, the direction of the motor current IL is from the second output terminal 136 to the first output terminal 134.

Figure 2:
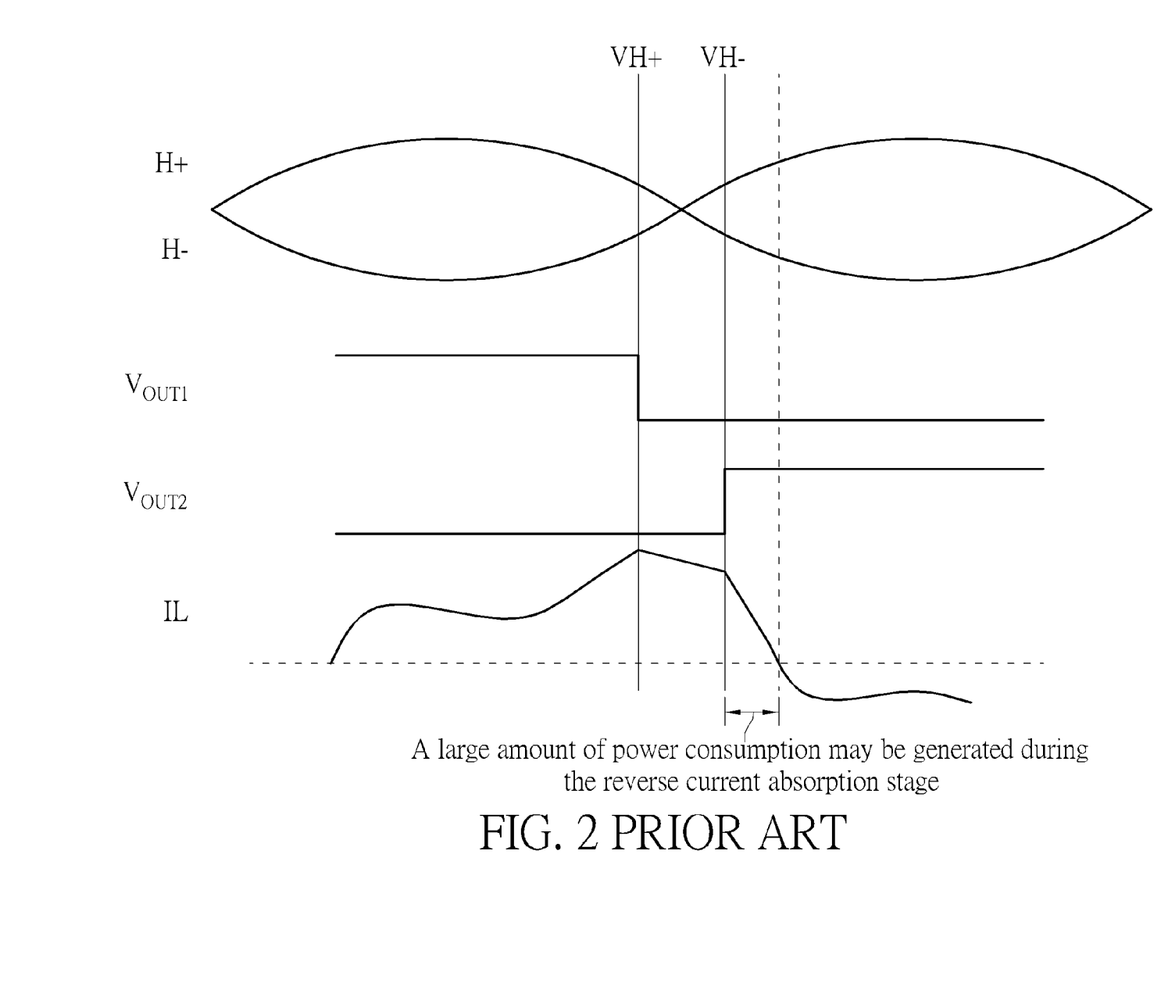
FIGS. 2-4 are timing diagrams of the first time sequential control signal, the second time sequential control signal, the first output voltage, the second output voltage and the motor current shown in FIG. 1.

Please refer to FIG. 2, which is a timing diagram of the first time sequential control signal H+, the second time sequential control signal H−, the first output voltage Vout1, the second output voltage Vout2 and the motor current IL shown in FIG. 1. When the voltage level of the first time sequential control signal H+ decreases to the first transition voltage VH+, the first output voltage Vout1 switches from a high voltage level to a low voltage level; when the voltage level of the first time sequential control signal H+ continues decreasing to the second transition voltage VH−, the second output voltage Vout2 switches from the low voltage level to the high voltage level. If the first transition voltage VH+ is set too low, a large amount of power consumption may be generated during the reverse current absorption stage (the period in which the voltage level of the first time sequential control signal H+ decreases to the second transition voltage VH− and the motor current decreases to zero) due to over-high motor current IL when the voltage level of the first time sequential control signal H+ decreases to the second transition voltage VH−, causing waste of electrical energy and even burn-down of the motor driving circuit 10.

Figure 3:
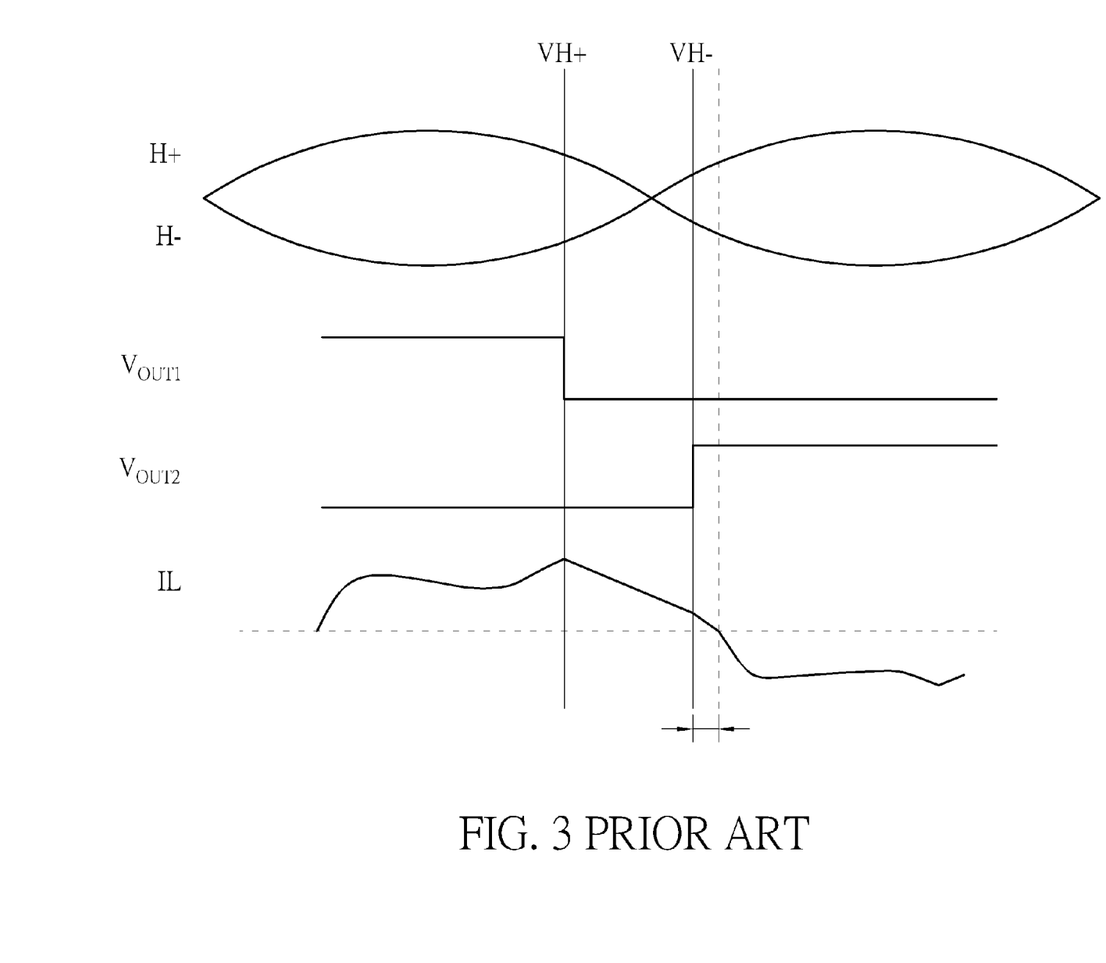

In order to solve the aforementioned problem, the prior art provides a method of adjusting the first transition voltage VH+ higher to overcome generation of a large amount of power consumption during the reverse current absorption stage which causes waste of electrical energy and burn-down of the motor driving circuit. Please refer to FIG. 3, after adjusting the first transition voltage VH+higher, the motor current IL can be lower when the voltage level of the first time sequential control signal H+ decreases to the second transition voltage VH− because the time interval for the voltage level of the first time sequential control signal H+ to decrease to the first transition voltage VH+ and to the second transition voltage VH− is prolonged. Therefore, the power consumption can be effectively reduced when entering the reverse current absorption stage.

Figure 4:
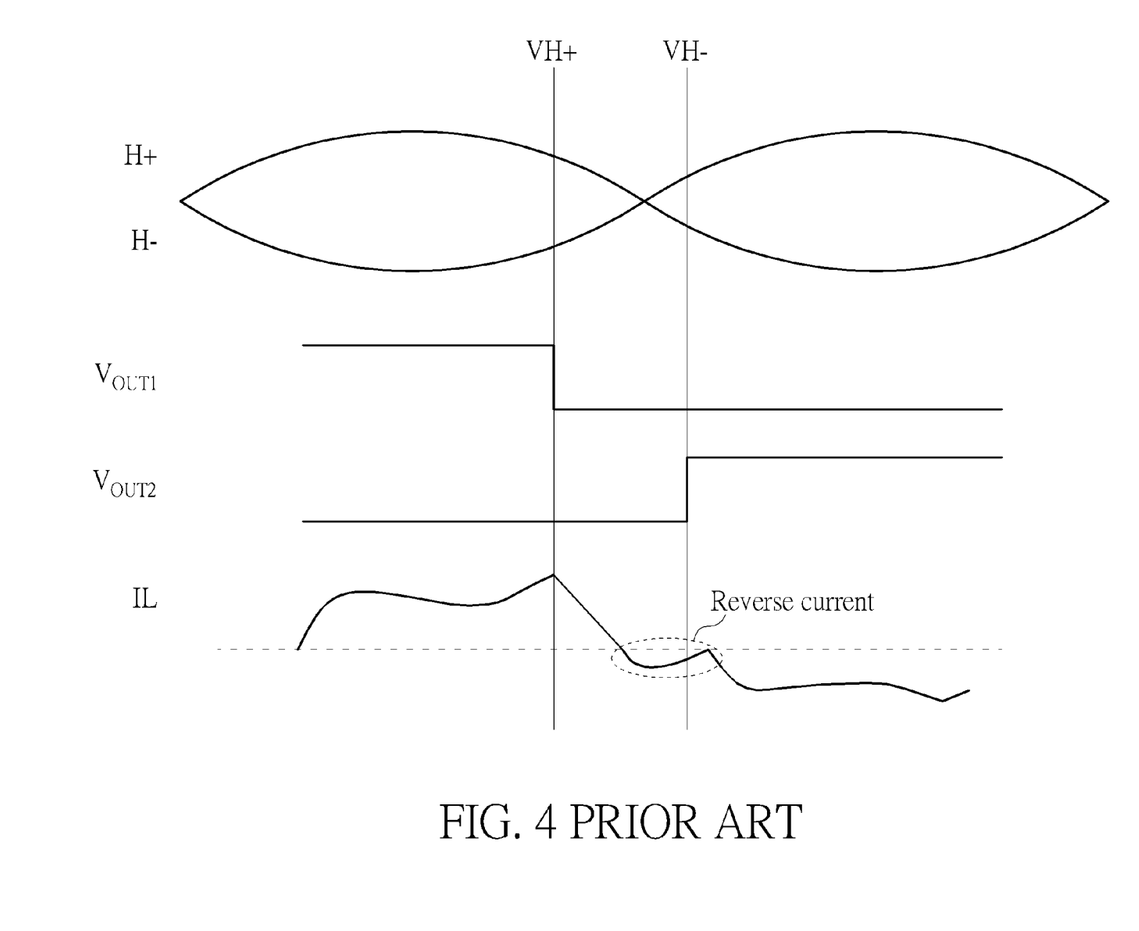

However, according to the aforementioned method, the motor current IL may decrease to zero too early during a situation that the speed of the motor load Le slows down or the motor current IL is over-low, such that the reverse current is generated, causing the problems that the working efficiency of the motor load Le becomes worse and noise is easily generated. Please also refer to FIG. 4, during the period that the voltage level of the first time sequential control signal H+ decreases to the first transition voltage VH+ and to the second transition voltage VH−, the motor current IL decreases to be lower than zero, causing the motor load IL to do negative work, and thus the working efficiency of the motor load Le becomes worse.

The aforementioned problems can be resolved by adjusting the first transition voltage VH+ lower again. However, the first transition voltage VH+ should be adjusted according to different conditions, and the prior art does not provide a mechanism of adaptive switching the transition voltage VH+. For the above reason, an improvement over the prior art is needed.

SUMMARY OF THE INVENTION

It is a primary objective of the present invention to provide a motor driving circuit and method that provide a mechanism of adaptive transition voltage switch capable of avoiding a condition of over-high motor current at phase switch of a DC motor or continuous generation of reverse current, so as to reduce power consumption and improve working efficiency of a the DC motor.

The present invention discloses a motor driving circuit for driving a direct-current (DC) motor. The motor driving circuit comprises a driving circuit, for converting an input voltage into a first output voltage and a second output voltage, the driving circuit comprising an input terminal, for receiving the input voltage; a first output terminal, for outputting the first output voltage; a second output terminal, for outputting the second output voltage; a first transistor, coupled between the input terminal and the first output terminal, for switching a conduction condition of the input terminal and the first output terminal according to a first transistor control signal; a second transistor, coupled between the first output terminal and a grounding terminal, for switching a conduction condition of the first output terminal and the grounding terminal according to a second transistor control signal; a third transistor, coupled between the input terminal and the second output terminal, for switching a conduction condition of the input terminal and the second output terminal according to a third transistor control signal; and a fourth transistor, coupled between the second output terminal and the grounding terminal, for switching a conduction condition of the second output terminal and the grounding terminal according to a fourth transistor control signal; a Hall sensor, for generating a first time sequential control signal and a second time sequential control signal according to a working condition of the DC motor; a current sensing unit, coupled to the first output terminal and the second output terminal, configured to compare a motor current through the DC motor with a reference current and generate a comparison result ; a control unit, comprising a counter, coupled to the current sensing unit, configured to generate a counting output according to the comparison result; a digital-to-analog convertor, coupled to the counter, configured to generate a first reference voltage and a second reference voltage according to the counting output; a first comparator, coupled to the digital-to-analog convertor and the Hall sensor, configured to generate a first transition voltage according to the first time sequential control signal, the second time sequential control signal and the first reference voltage; and a second comparator, coupled to the digital-to-analog convertor and the Hall sensor, configured to generate a second transition voltage according to the first time sequential control signal, the second time sequential control signal and the first reference voltage; and a logic unit, coupled to the first comparator, the second comparator, first transistor, the second transistor, the third transistor, and the fourth transistor, configured to generate the first transistor control signal, the second transistor control signal, the third transistor control signal and the fourth transistor control signal according to the first transition voltage and the second transition voltage; wherein when the comparison result indicates that the motor current is higher than the reference current, the control unit adjusts the first transition voltage higher; wherein when the comparison result indicates that the motor current is lower than the reference current, the control unit adjusts the first transition voltage lower.

The present invention further discloses a method for driving a direct-current (DC) motor, utilized in a motor driving circuit, the motor driving circuit comprising a driving circuit, a Hall sensor, a current sensing unit and a control unit, the method comprising the Hall sensor generating a first time sequential control signal and a second time sequential control signal; the current sensing unit comparing a motor current through the DC motor with a reference current and generating a comparison result; the control unit adjusting a first transition voltage according to the comparison result, and generating a second transition voltage; and the control unit controlling the driving circuit to convert the input voltage into the first output voltage and the second output voltage according to the first time sequential control signal, the second time sequential control signal and the first transition voltage; wherein when the comparison result indicates that the motor current is higher than the reference current, the control unit adjusts the first transition voltage higher; wherein when the comparison result indicates that the motor current is lower than the reference current, the control unit adjusts the first transition voltage lower.

These and other objectives of the present invention will no doubt become obvious to those of ordinary skill in the art after reading the following detailed description of the preferred embodiment that is illustrated in the various figures and drawings.

DETAILED DESCRIPTION

Figure 5:
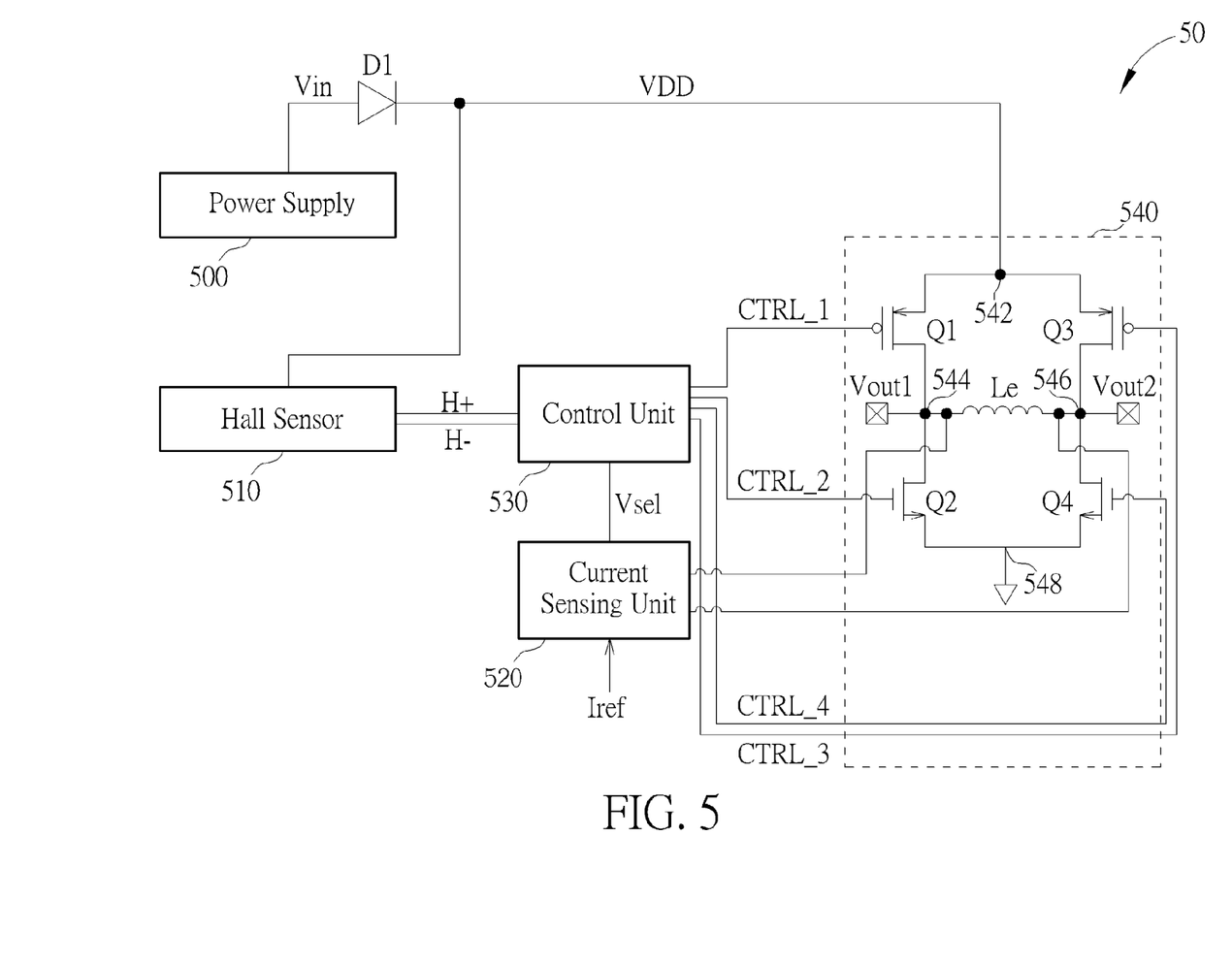
FIG. 5 is a schematic diagram of a motor driving circuit according to an embodiment of the present invention.

Please refer to FIG. 5, which is a schematic diagram of a motor driving circuit 50 according to an embodiment of the present invention. The motor driving circuit 50 includes a power supply 500, a protection diode D1, a Hall sensor 510, a current sensing unit 520, a control unit 530, a driving circuit 540 and a motor load Le. The working characteristics of the power supply 500, the protection diode D1, the Hall sensor 510, the driving circuit 540, the motor load Le, and respective components thereof are substantially similar to the power supply 100, the protection diode D1, the Hall sensor 110, the driving circuit 130 and the motor load Le; therefore, the same components are denoted by the same symbols of FIG. 1, and the operations or the same components are not narrated hereinafter for simplicity. The current sensing unit 520 is utilized for detecting the motor current IL through the motor load Le, and comparing the motor current IL to a reference current Iref to generate a comparison result Vsel for determining a first transition voltage VH+ accordingly. The control unit 530, which is coupled to the Hall sensor 510 and the current sensing unit 520, is utilized for receiving a first time sequential control signal H+, a second time sequential control signal H− and the comparison result Vsel and generating a first transistor control signal CTRL_1, a second transistor control signal CTRL_2, a third transistor control signal CTRL_3 and a fourth transistor control signal CTRL_4 accordingly, so as to control the driving circuit 540.

Figure 7:
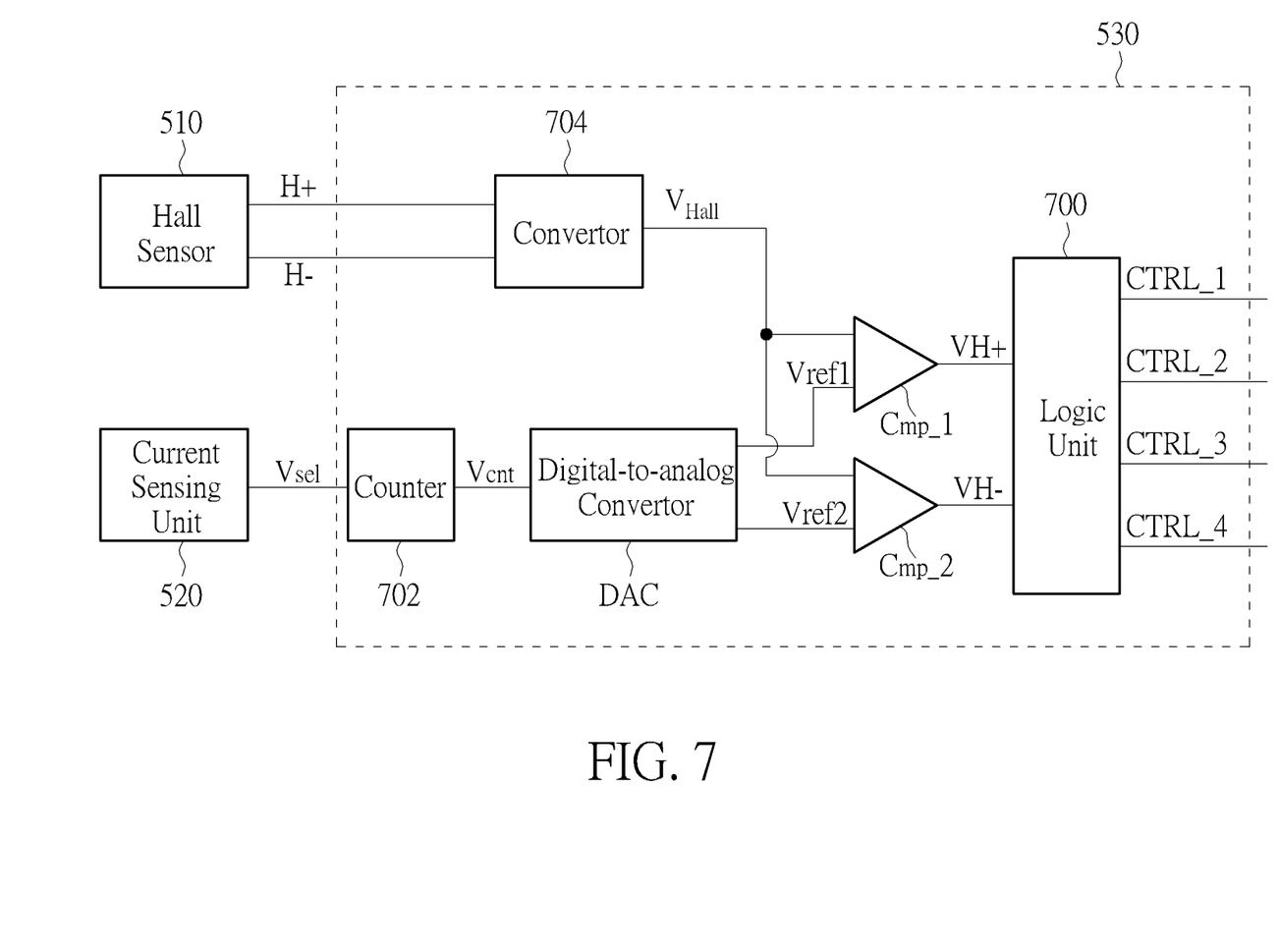
FIG. 7 is a schematic diagram of a control unit according to an embodiment of the present invention.

Specifically, FIG. 7 is a schematic diagram of the control unit 530. The control unit 530 comprises a logic unit 700, a counter 702, a digital-to-analog convertor DAC, and comparators Cmp_1, Cmp_2. The counter 702 is coupled to the current sensing unit 520, configured to generate a counting output Vcnt according to the comparison result Vsel. Note that the comparison result Vsel is a binary comparison result indicating whether the motor current IL is higher than the reference current Iref or the motor current IL is lower than the reference current Iref. Specifically, when the comparison result Vsel indicates that the motor current IL is higher than the reference current Iref, the counter 702 counts up and the counting output Vcnt is increasing. On the other hand, when the comparison result Vsel indicates that the motor current IL is lower than the reference current Iref, the counter 702 counts down and the counting output Vcnt is decreasing. The digital-to-analog convertor DAC is coupled to the counter 702, configured to generate a first reference voltage Vref1 and a second reference voltage Vref2 according to the counting output Vcnt. The comparators Cmp_1, Cmp_2 are coupled to the digital-to-analog convertor DAC and the Hall sensor 510. Specifically, the comparators Cmp_1, Cmp_2 are coupled to the Hall sensor 510 via a convertor 704. The convertor 704 converts the first time sequential control signal H+ and the second time sequential control signal H−, a pair of differential signals, into a single-ended signal $V_{Hall}$. The comparator Cmp_1 is configured to generate a first transition voltage VH+ according to the first reference voltage Vref1 and the signal $V_{Hall}$. The comparator Cmp_2 is configured to generate a second transition voltage VH− according to the second reference voltage Vref2 and the signal $V_{Hall}$. The logic unit 700 is coupled to the comparators Cmp_1, Cmp_2, configured to generate the first transistor control signal CTRL_1, the second transistor control signal CTRL_2, the third transistor control signal CTRL_3 and the fourth transistor control signal CTRL_4 according to the first transition voltage VH+ and the second transition voltage VH−. Therefore, the control unit 70 may adjust the first transition voltage VH+ according to the comparison result Vsel.

In detail, when the first time sequential control signal H+ reaches the first transition voltage VH+, the control unit 530 can switch the first output voltage Vout1 from a high voltage level to a low voltage level by the first transistor control signal CTRL_1, the second transistor control signal CTRL_2, the third transistor control signal CTRL_3 and the fourth transistor control signal CTRL_4, and when the first time sequential control signal H+ reaches the second transition voltage VH−, the control unit 530 can switch the second output voltage Vout2 from the low voltage level to the high voltage level by the first transistor control signal CTRL_1, the second transistor control signal CTRL_2, the third transistor control signal CTRL_3 and the fourth transistor control signal CTRL_4. When the second output voltage Vout2 switches from the low voltage level to the high voltage level, the control unit 530 may adjust the first transition voltage VH+ according to the comparison result Vsel, i.e., the magnitude of the motor current IL. When the motor current IL is over-high (i.e. higher than the reference current Iref), the control unit 530 can timely adjust the first transition voltage VH+ higher, and when the motor current IL is over-low (i.e. lower than the reference current Iref), the control unit 530 can timely adjust the first transition voltage VH+ lower. As such, the control unit 530 can adjust the first transition voltage VH+ according to the comparison result Vsel. It should be noted that the first transition voltage is between a first threshold value and a second threshold value of the motor driving circuit 50.

Figure 6A:
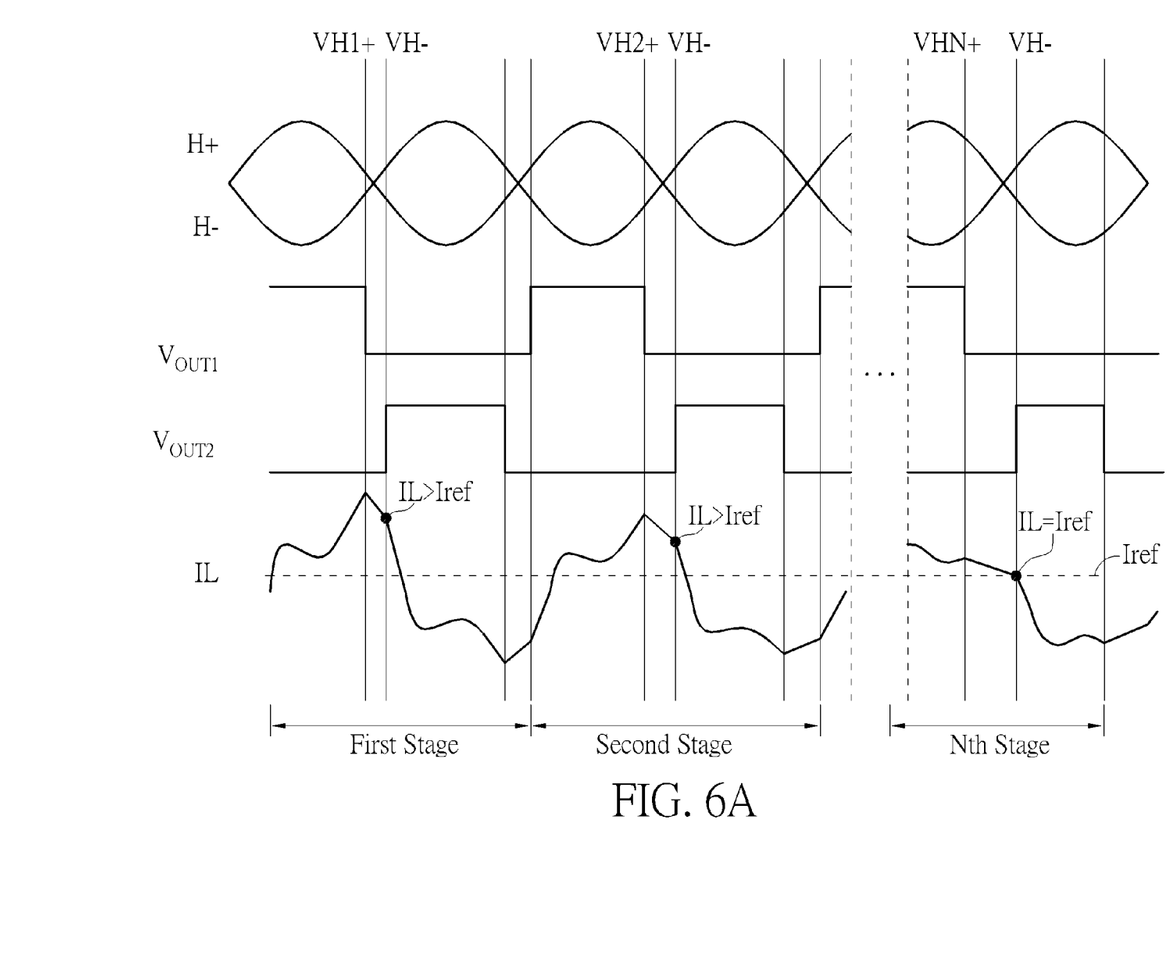
FIG. 6A and FIG. 6B are timing diagrams of the first time sequential control signal, the second time sequential control signal, the first output voltage, the second output voltage and the motor current shown in FIG. 5.
Figure 6B:
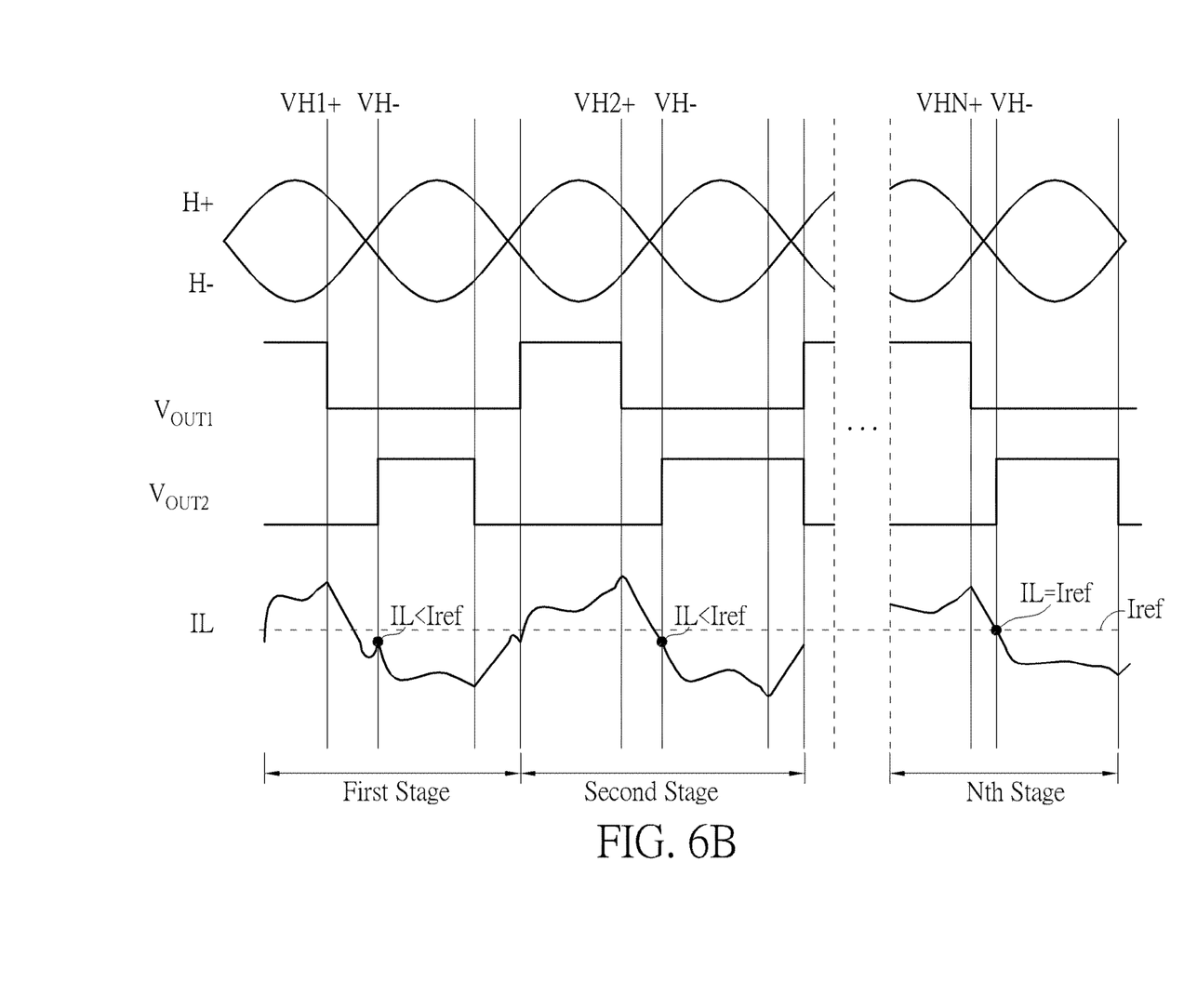

For the operation of the motor driving circuit 50, please further refer to FIG. 6A and FIG. 6B, which are timing diagrams of the first time sequential control signal H+, the second time sequential control signal H−, the first output voltage Vout1, the second output voltage Vout2 and the motor current IL shown in FIG. 5. A horizontal dashed line in a bottom of FIGS. 6A and 6B represents a current level of the reference current Iref. FIG. 6A illustrates the condition of gradually adjusting the first transition voltage higher, and FIG. 6B illustrates the condition of gradually adjusting the first transition voltage lower.

Please refer to FIG. 6A, during the first stage, when the voltage level of the first time sequential control signal H+ decreases to a first transition voltage VH1+ of the first stage, the first output voltage Vout1 switches from the high voltage level to the low voltage level. When the voltage level of the first time sequential control signal H+ decreases to the second transition voltage VH−, the second output voltage Vout2 switches from the low voltage level to the high voltage level. The current sensing unit 520 determines the motor current IL when the second output voltage Vout2 switches from the low voltage level to the high voltage level, and compares the motor current IL to the reference current Iref. Because the motor current IL is higher than the reference current Iref, the control unit 530 adjusts the first transition voltage VH+ higher, such that a first transition voltage VH2+ of the second stage will be higher than the first transition voltage VH1+ of the first stage. During the second stage, when the voltage level of the first time sequential control signal H+ decreases to the first transition voltage VH2+, the first output voltage Vout1 switches from the high voltage level to the low voltage level. When the voltage level of the first time sequential control signal H+ decreases to the second transition voltage VH−, the second output voltage Vout2 switches from the low voltage level to the high voltage level. At the time that the second output voltage Vout2 switches from the low voltage level to the high voltage level, if the motor current IL is still higher than the reference current Iref, the control unit 530 continuously adjusts the first transition voltage VH+ higher. That is, a first transition voltage VH3+ of the third stage will be higher than the first transition voltage VH2+ of the second stage. The control unit 530 stops adjusting the first transition voltage VH+ higher if the motor current IL is equal to the reference current Iref at the time that the second output voltage Vout2 switches from the low voltage level to the high voltage level during the Nth stage.

Please refer to FIG. 6B. During the first stage, when the voltage level of the first time sequential control signal H+ decreases to the first transition voltage VH1+ of the first stage, the first output voltage Vout1 switches from the high voltage level to the low voltage level. When the voltage level of the first time sequential control signal H+ decreases to the second transition voltage VH−, the second output voltage Vout2 switches from the low voltage level to the high voltage level. The current sensing unit 520 determines the motor current IL when the second output voltage Vout2 switches from the low voltage level to the high voltage level, and compares the motor current IL to the reference current Iref. Because the motor current IL is lower than the reference current Iref, the control unit 530 adjusts the first transition voltage VH+ lower, such that the first transition voltage VH2+ of the second stage will be lower than the first transition voltage VH1+ of the first stage. During the second stage, when the voltage level of the first time sequential control signal H+ decreases to the first transition voltage VH2+, the first output voltage Vout1 switches from the high voltage level to the low voltage level. When the voltage level of the first time sequential control signal H+ decreases to the second transition voltage VH−, the second output voltage Vout2 switches from the low voltage level to the high voltage level. At the time that the second output voltage Vout2 switches from the low voltage level to the high voltage level, if the motor current IL is still lower than the reference current Iref, the control unit 530 continuously adjusts the first transition voltage VH+ lower. That is, the first transition voltage VH3+ of the third stage will be lower than the first transition voltage VH2+ of the second stage. The control unit 530 stops adjusting the first transition voltage VH+ lower if the motor current IL is equal to the reference current Iref at the time that the second output voltage Vout2 switches from the low voltage level to the high voltage level during the Nth stage.

As can be seen from FIG. 6A and FIG. 6B, the motor driving circuit of the present invention provides a mechanism of adaptive switching the first transition voltage for timely adjusting the first transition voltage higher when the motor current is over-high and adjusting the first transition voltage lower when the motor current is over-low. In comparison, the prior art motor driving circuit lacks of the mechanism of adaptive switching the first transition voltage, such that the first transition voltage needs to be adjusted manually for different applications, causing inconvenience in usage.

A method of motor driving can be derived from the embodiment of the present invention, which includes the Hall sensor generating a first time sequential control signal and a second time sequential control signal; the current sensing unit comparing a motor current through the DC motor with a reference current and generating a comparison result; the control unit adjusting a first transition voltage according to the comparison result, and generating a second transition voltage; and the control unit controlling the driving circuit to convert an input voltage into a first output voltage and a second output voltage according to the first time sequential control signal, the second time sequential control signal and the first transition voltage. When the comparison result indicates that the motor current is higher than the reference current, the control unit adjusts the first transition voltage higher. When the comparison result indicates that the motor current is lower than the reference current, the control unit adjusts the first transition voltage lower. When the first time sequential control signal continues decreasing to a second transition voltage, the control unit adjusts the first transition voltage higher if the motor current is higher than the reference current. As such, when the motor driving circuit enters to the next stage, the motor current can decrease earlier because the first transition voltage is adjusted higher. During the next stage, at the time the voltage level of the first time sequential control signal decreases to the second transition voltage, if the motor current is still higher than the reference current, the control unit continues adjusting the first transition voltage higher until the motor current equals to the reference current at the time that the second output voltage switches from the low voltage level to the high voltage level during the following stage. Conversely, when the first time sequential control signal continues decreasing to the second transition voltage, the control unit adjusts the first transition voltage lower if the motor current is lower than the reference current. As such, when the motor driving circuit enters the next stage, the motor current can decrease later because the first transition voltage is adjusted lower according to the decreasing of the first transition voltage. During the next stage, at the time that the voltage level of the first time sequential control signal decreases to the second transition voltage, if the motor current is still lower than the reference current, the control unit continues adjusting the first transition voltage lower until the motor current equals the reference current at the time that the second output voltage switches from the low voltage level to the high voltage level during the following stage.

To sum up, the motor driving circuit of the present invention provides the mechanism of adaptive switching transition voltage capable of avoiding a condition of overhigh motor current which causes redundant power consumption at phase switch of a DC motor or continuous generation of reverse current which makes the DC motor work inefficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A motor driving circuit for driving a motor, comprising:
a driving circuit, for converting an input voltage into a first output voltage and a second output voltage, the driving circuit comprising:
an input terminal, for receiving the input voltage;
a first output terminal, for outputting the first output voltage, electrically connected to a first end of the motor;
a second output terminal, for outputting the second output voltage, electrically connected to a second end of the motor;
a first transistor, coupled between the input terminal and the first output terminal, for switching a conduction condition of the input terminal and the first output terminal according to a first transistor control signal;
a second transistor, coupled between the first output terminal and a grounding terminal, for switching a conduction condition of the first output terminal and the grounding terminal according to a second transistor control signal;

a third transistor, coupled between the input terminal and the second output terminal, for switching a conduction condition of the input terminal and the second output terminal according to a third transistor control signal; and a fourth transistor, coupled between the second output terminal and the grounding terminal, for switching a conduction condition of the second output terminal and the grounding terminal according to a fourth transistor control signal;

a Hall sensor, for generating a first time sequential control signal and a second time sequential control signal according to a working condition of the motor;

a current sensing unit, electrically connected to the first end and the second end of the motor, configured to detect a motor current through the motor and compare the motor current with a reference current and generate a comparison result;

a control unit, comprising:
  a counter, coupled to the current sensing unit, configured to generate a counting output according to the comparison result, wherein the counter counts up or counts down according to the comparison result indicating that the motor current is higher or lower than the reference current;
  a digital-to-analog convertor, coupled to the counter, configured to generate a first reference voltage and a second reference voltage according to the counting output;
  a first comparator, coupled to the digital-to-analog convertor and the Hall sensor, configured to generate a first transition voltage according to the first time sequential control signal, the second time sequential control signal and the first reference voltage; and
  a second comparator, coupled to the digital-to-analog convertor and the Hall sensor, configured to generate a second transition voltage according to the first time sequential control signal, the second time sequential control signal and the first reference voltage; and
  a logic unit, coupled to the first comparator, the second comparator, first transistor, the second transistor, the third transistor, and the fourth transistor, configured to generate the first transistor control signal, the second transistor control signal, the third transistor control signal and the fourth transistor control signal according to the first transition voltage and the second transition voltage;

wherein when the first time sequential control signal generated by the Hall sensor decreases and is less than the first transition voltage generated by the control unit, the control unit controls the first transistor, the second transistor, the third transistor and the fourth transistor such that the first output voltage transits from a high voltage level to a low voltage level;

wherein when the comparison result indicates that the motor current is higher than the reference current, the control unit adjusts the first transition voltage higher;

wherein when the comparison result indicates that the motor current is lower than the reference current, the control unit adjusts the first transition voltage lower.

2. The motor driving circuit of claim 1, wherein when the first time sequential control signal reaches the second transition voltage, the control unit evaluates the comparison result and adjusts the first transition voltage according to the comparison result.

3. The motor driving circuit of claim 1, wherein the first transition voltage is between a first threshold value and a second threshold value.

4. The motor driving circuit of claim 1, wherein the first transistor and the third transistor are P-type metal-oxide-semiconductor (MOS) transistors.

5. The motor driving circuit of claim 1, wherein the first transistor and the third transistor are N-type MOS transistors.

6. The motor driving circuit of claim 1, wherein the second transistor and the fourth transistor are P-type MOS transistors.

7. The motor driving circuit of claim 1, wherein the second transistor and the fourth transistor are N-type MOS transistors.

8. A method for driving a motor, utilized in a motor driving circuit, the motor driving circuit comprising a driving circuit, a Hall sensor, a current sensing unit and a control unit, the method comprising:
  the Hall sensor generating a first time sequential control signal and a second time sequential control signal;
  the current sensing unit comparing a motor current through the motor with a reference current and generating a comparison result, wherein the current sensing unit is electrically connected to a first end and a second end of the motor;
  the control unit adjusting a first transition voltage according to the comparison result; and
  the control unit controlling the driving circuit to convert an input voltage into a first output voltage and a second output voltage according to the first time sequential control signal, the second time sequential control signal and the first transition voltage;

wherein when the first time sequential control signal generated by the Hall sensor decreases and is less than the first transition voltage generated by the control unit, the control unit controls the first transistor, the second transistor, the third transistor and the fourth transistor such that the first output voltage transits from a high voltage level to a low voltage level;

wherein when the comparison result indicates that the motor current is higher than the reference current, the control unit adjusts the first transition voltage higher;

wherein when the comparison result indicates that the motor current is lower than the reference current, the control unit adjusts the first transition voltage lower.

9. The method of claim 8, wherein when the first time sequential control signal reaches a second transition voltage, the control unit evaluates the comparison result and adjusts the first transition voltage according to the comparison result.

10. The method of claim 8, wherein the first transition voltage is between a first threshold value and a second threshold value.

* * * * *